US012395065B2

(12) United States Patent
Scobie et al.

(10) Patent No.: US 12,395,065 B2
(45) Date of Patent: Aug. 19, 2025

(54) ELECTRIC POWER CONVERTER FOR A PHOTOVOLTAIC ENERGY SOURCE

(71) Applicant: Third Equation Ltd, London (GB)

(72) Inventors: Andrew John Scobie, London (GB); Kamel Bouallaga, London (GB); Patryk Wladyslaw Pociask, London (GB); Leong Kit Gan, London (GB); Xiao Xu, London (GB)

(73) Assignee: THIRD EQUATION LTD, London (GB)

( * ) Notice: Subject to any disclaimer, the term of this patent is extended or adjusted under 35 U.S.C. 154(b) by 164 days.

(21) Appl. No.: 17/906,187

(22) PCT Filed: Jul. 8, 2020

(86) PCT No.: PCT/AU2020/050712
§ 371 (c)(1),
(2) Date: Sep. 12, 2022

(87) PCT Pub. No.: WO2021/179032
PCT Pub. Date: Sep. 16, 2021

(65) Prior Publication Data
US 2023/0111730 A1    Apr. 13, 2023

(30) Foreign Application Priority Data

Mar. 11, 2020    (AU) ............................... 2020900738

(51) Int. Cl.
*H02M 7/48*    (2007.01)
*H02M 1/12*    (2006.01)
(Continued)

(52) U.S. Cl.
CPC ............... *H02M 1/12* (2013.01); *H02M 1/42* (2013.01); *H02M 5/4585* (2013.01); *H02M 7/48* (2013.01)

(58) Field of Classification Search
CPC ........ H02M 1/12; H02M 1/42; H02M 1/4208; H02M 1/4216; H02M 1/425;
(Continued)

(56) References Cited

U.S. PATENT DOCUMENTS 8,796,884 B2    8/2014    Naiknaware et al.
9,806,628 B2    10/2017   Chapman et al.
(Continued)

FOREIGN PATENT DOCUMENTS

JP    H02213912 A    8/1990
JP    H08-103085 A   4/1996
(Continued)

OTHER PUBLICATIONS

PCT International Search Report and Written Opinion, PCT Application No. PCT/AU2020/050712, Aug. 25, 2020, 16 pages.
(Continued)

*Primary Examiner* — Alex Torres-Rivera
(74) *Attorney, Agent, or Firm* — Perilla Knox & Hildebrandt LLP; Jason M. Perilla

(57) ABSTRACT

An electric power converter for a photovoltaic energy source, including: an inverter to receive a dynamically changing DC signal generated by the photovoltaic energy source and to generate a corresponding dynamically changing AC signal having a frequency substantially equal to a mains supply frequency; and an electromagnetic apparatus, including: a magnetic core and a plurality of windings around the magnetic core. The windings include: one or more input windings to receive the dynamically changing AC signal as an AC input; one or more output windings to provide an AC output signal; and control windings configured to control electromagnetic coupling between the input and output windings; and a control component configured to dynamically control electrical currents through the control
(Continued)

windings so that the electrical characteristics of the AC output signal are relatively constant despite the dynamically changing AC signal and include a fundamental frequency equal to the mains supply frequency.

10 Claims, 15 Drawing Sheets

(51) Int. Cl.
  *H02M 1/42* (2007.01)
  *H02M 5/458* (2006.01)
(58) Field of Classification Search
  CPC .... H02M 1/4258; H02M 5/453; H02M 5/458; H02M 7/42; H02M 7/48
  See application file for complete search history.

(56) References Cited

U.S. PATENT DOCUMENTS

| | | |
|---|---|---|
| 2012/0206118 A1 | 8/2012 | Williams |
| 2013/0016536 A1 | 1/2013 | Ehlmann et al. |
| 2013/0027982 A1 | 1/2013 | Chapman et al. |
| 2015/0244249 A1* | 8/2015 | Chen .................. H02J 3/01 363/41 |
| 2017/0126011 A1* | 5/2017 | Jussila .................. H02J 3/38 |
| 2017/0294875 A1* | 10/2017 | Xu .................. H02M 7/49 |
| 2018/0254732 A1 | 9/2018 | Smolenaers |
| 2019/0369651 A1 | 12/2019 | Williams et al. |

FOREIGN PATENT DOCUMENTS

| | | |
|---|---|---|
| JP | 2009238966 A | 10/2009 |
| WO | WO 2019/178642 A1 | 9/2019 |

OTHER PUBLICATIONS

European Patent Office, Extended European Search Report and Opinion, EP Patent Application No. EP 20924587, Apr. 9, 2024, eight pages.

Japanese Intellectual Property Office, Office Action, JP Patent Application No. 2022-554597, Jul. 30, 2024, 10 pages.

Office Action for Australian Application No. 2020434577 mailed Feb. 12, 2025.

Office Action for Korean Application No. 10-2022-7034895 mailed Apr. 24, 2025.

Office Action for Chinese Application No. 2020800998204 mailed Feb. 7, 2025.

* cited by examiner

Primary voltage and current measures

Phase Locked Loop

ELECTRIC POWER CONVERTER FOR A PHOTOVOLTAIC ENERGY SOURCE

TECHNICAL FIELD

The present invention relates to photovoltaic energy generation, and in particular to an electric power converter for interfacing a photovoltaic energy source to a mains electricity supply.

BACKGROUND

In order to meet the increasing energy demands of a growing population while fossil fuel reserves become depleted and greenhouse gas emissions need to be curtailed, there is a general recognition that renewable energy sources such as solar and wind power need to become more widely used and to replace non-renewable energy sources such as coal, oil, and gas.

In particular, photovoltaic modules that generate electric power from solar radiation have become increasingly popular in recent years. However, existing photovoltaic module technology is not without its difficulties. In particular, a photovoltaic ("PV") module generates a variable amount of electric power that depends upon such things as the amount of solar radiation incident upon the panel, and the temperature of the module. Generally speaking, the voltage produced by a photovoltaic module is a "direct current" or "DC" voltage that must be converted to an alternating current or "AC" voltage at the mains supply frequency (of either 50 Hz or 60 Hz, depending on region) in order to be fed into the mains power supply or used to power appliances and/or other electric or electronic devices that have been designed to be energised by mains power. This conversion is performed by an electric power converter device also commonly (and somewhat inaccurately, as will be apparent from the description below) referred to for convenience as an "inverter", which also performs the important function of galvanically isolating the AC mains power supply from the photovoltaic module to prevent DC from polluting the mains supply in case of a fault.

Unfortunately, prior art electric power converters for photovoltaic modules generally suffer from a number of difficulties. For example, FIG. 1 is a block diagram of a typical commercially available prior art electric power converter 102 for a photovoltaic module, shown interfacing a photovoltaic (PV) energy source (e.g., a module or 'panel' of interconnected photovoltaic solar cells) 104 to a mains power grid 106. The prior art electric power converter 102 includes a first inverter component 108 to generate AC power from the DC power generated by the PV source 104, followed by a conventional electromagnetic transformer 110 in order to provide the required galvanic isolation. However, as will be apparent to those skilled in the art, in order to reduce the physical size and weight of the transformer 110, the first inverter component 108 generates AC Power at a frequency that is significantly higher than the required output mains frequency of 50 or 60 Hz. For example, a typical prior art electric power converter 102 for a typical PV module 104 might include a transformer 110 with a power rating of 10 kVA and configured to operate at a frequency of 400 Hz, nearly an order of magnitude higher than the mains frequency. Consequently, the first inverter component 108 would also need to be rated at 10 kVA and operate at a switching frequency of about 4.8 kHz (the switching frequency typically being a factor of 12 times the desired output signal frequency).

In order to reduce the high frequency of the AC signal output by the transformer 110, this signal is provided to a rectifier 112 (in this example also operating at 4.8 kHz and rated at 10 kVA) to generate a corresponding DC signal that in turn is fed to a second inverter component 114 configured to generate an output AC signal at the desired mains frequency. In this example, with the mains frequency of 50 Hz, the second inverter 114 would be rated at 10 kVA and would operate at a switching frequency of 600 Hz (12×50 Hz).

Unfortunately, such prior art electric power converters 102 suffer from poor reliability, and there are many technical publications in the literature investigating this issue.

It is desired, therefore, to overcome or alleviate one or more difficulties of the prior art, or to at least provide a useful alternative.

SUMMARY

In accordance with some embodiments of the present invention, there is provided an electric power converter for a photovoltaic energy source, including:
  an inverter component configured to receive electrical energy in the form of a dynamically changing DC signal generated by the photovoltaic energy source and to generate a corresponding dynamically changing AC signal having a frequency substantially equal to a mains supply frequency; and
  an electromagnetic apparatus, including:
    a magnetic core;
    a plurality of windings around corresponding portions of the magnetic core, the plurality of windings including:
      one or more input windings to receive the dynamically changing AC signal as an AC input signal having dynamically changing electrical characteristics;
      one or more output windings to provide an AC output signal; and
      control windings configured to control electromagnetic coupling between the input windings and the output windings; and
    a control component configured to dynamically control electrical currents through the control windings in dependence on the dynamically changing electrical characteristics of the AC input signal so that corresponding electrical characteristics of the AC output signal are relatively constant and include a fundamental frequency equal to the mains supply frequency.

In some embodiments, the control component is configured to dynamically control the electrical currents through the control windings to reduce harmonics in the AC output signal.

In some embodiments, the control component is configured to dynamically control the electrical currents through the control windings to maintain a substantially constant amplitude of the AC output signal.

In some embodiments, the control component is configured to dynamically inject or absorb reactive power to or from the input windings to maintain a power factor of substantially unity.

In some embodiments, the control component is configured to execute a maximum power point tracking ("MPPT") process to dynamically control the output voltage of the inverter component and thereby increase power extracted from the photovoltaic energy source.

In some embodiments, the control component includes a power electronics component to generate the electrical currents for the control windings, and one or more signal processing components to control the power electronics component, the power electronics component including a rectifier component, one or more capacitors, and a second inverter component, the rectifier component being configured to receive AC power from windings around the magnetic core and to generate corresponding DC power to charge the capacitors, and the second inverter component being configured to generate the electrical currents for the control windings from power stored in the capacitors, under control of the one or more signal processing components.

In some embodiments, the one or more signal processing components generate PWM signals to control switching transistors of the second inverter component to generate the electrical currents for the control windings.

In some embodiments, the rectifier component is further configured to dynamically transfer reactive power between the capacitors and the input windings to maintain a power factor of substantially unity.

In some embodiments, the one or more signal processing components generate second PWM signals to control second switching transistors of the second inverter component to control the transfer of reactive power between the capacitors and the input windings.

In some embodiments, the one or more signal processing components includes a first signal processing component configured to generate control signals for controlling the current through the control windings, and a second signal processing component configured to process the control signals to generate corresponding PWM signals to control switching transistors of the power electronics component.

In accordance with some embodiments of the present invention, there is provided an electric power converter process for execution by the control component of any one of the above electric power converters, the electric power converter process including the steps of:
 (i) receiving signals representing an output voltage of the photovoltaic energy source, an output current of the photovoltaic energy source, and a voltage of the output windings of the magnetic core; and
 (ii) processing the received signals to generate corresponding first control signals to control the output voltage of the inverter to maximise output power of the photovoltaic energy source, and second control signals to dynamically control the electrical currents through the control windings.

In accordance with some embodiments of the present invention, there is provided at least one computer-readable storage medium having stored thereon processor-executable instructions and/or configuration data representing the electric power converter process.

Also described herein is an electric power converter for a photovoltaic energy source, including:
 an inverter component configured to receive electrical energy in the form of a dynamically changing DC signal generated by the photovoltaic energy source and to generate a corresponding dynamically changing AC signal having a frequency substantially equal to a mains supply frequency; and
 an electromagnetic apparatus, including:
  a magnetic core;
  a plurality of windings around corresponding portions of the magnetic core, the plurality of windings including:
   an input winding to receive the dynamically changing AC signal as an AC input signal having dynamically changing electrical characteristics; and
   an output winding to provide an AC output signal; and
   control windings configured to control electromagnetic coupling between the input winding and the output winding; and
 a control component configured to dynamically control electrical currents through the control windings in dependence on the dynamically changing electrical characteristics of the AC input signal so that corresponding electrical characteristics of the AC output signal are relatively constant and include a fundamental frequency equal to the mains supply frequency.

BRIEF DESCRIPTION OF THE DRAWINGS

Some embodiments of the present invention are hereinafter described, by way of example only, with reference to the accompanying drawings, wherein like components have like reference numerals, and wherein:

FIG. 17 is a partial circuit diagram showing how the primary windings of each phase of a multi-phase electric power converter are coupled to capacitors of the rectifier via a corresponding inductor to ensure that only reactive power flows to and from the primary windings to achieve power factor control.

DETAILED DESCRIPTION

Figure 1:
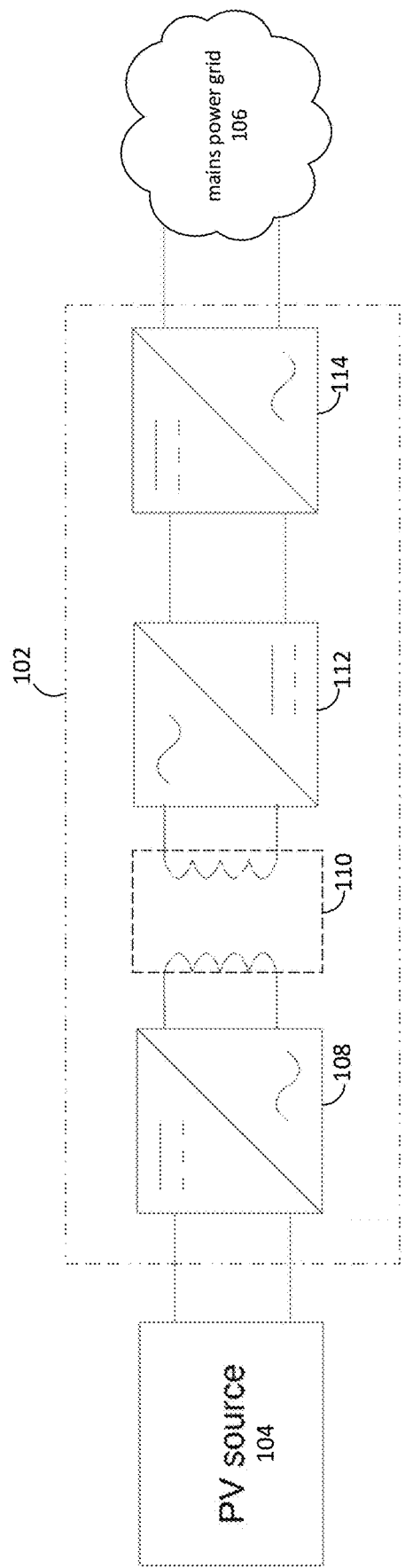
FIG. 1 is a block diagram of a prior art electric power converter interfacing a photovoltaic energy source to a mains electricity supply.
Figure 2:
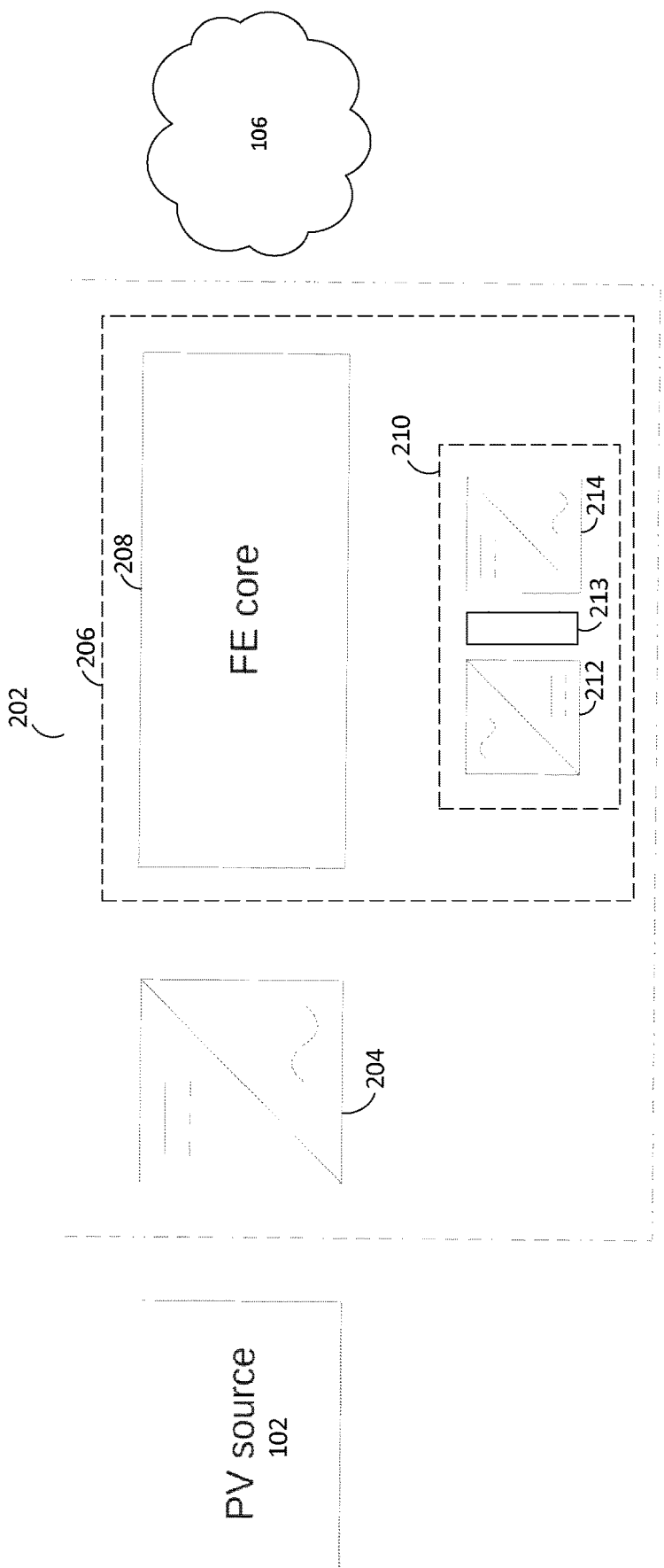
FIG. 2 is a block diagram of an electric power converter in accordance with an embodiment of the present invention.

As shown in FIG. 2, an electric power converter 202 in accordance with an embodiment of the present invention provides the functions of a typical prior art electric power converter such as the one 102 shown in FIG. 1 in that it receives the DC power generated by a PV source 104, converts that power to an AC signal at the required mains frequency, and provides galvanic isolation between the PV source 104 and the mains power supply 106 (and/or to appliances or other types of electric/electronic devices).

However, in addition to the standard functions, the described electric power converter 202 also provides dynamic control of the amplitude, fundamental frequency, harmonics and power factor of the output AC signal.

As shown in FIG. 2, the electric power converter 202 includes an inverter component 204 and an electromagnetic device 206 of the type described in the Applicant's International patent application No. PCT/AU2019/050246 entitled "An electrical power control apparatus and process" (hereinafter referred to as "the Faraday Exchanger patent application"), the entirety of which is hereby expressly incorporated by reference. For convenience of reference, the electromagnetic device 206 is also referred to herein as a "Faraday exchanger".

Figure 3:
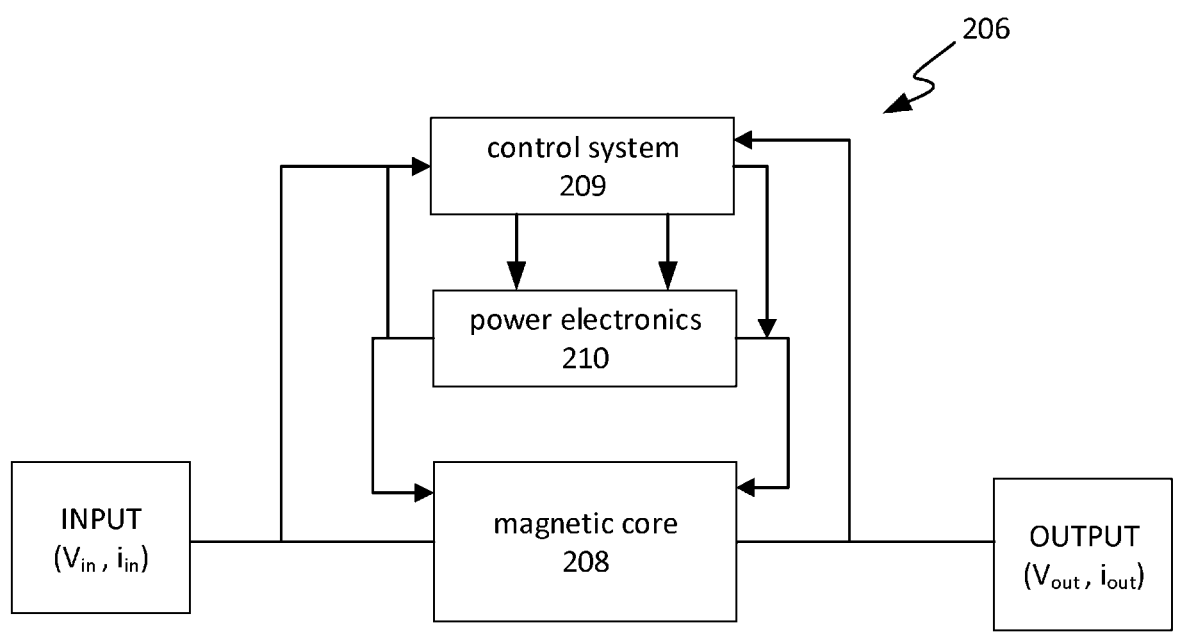
FIG. 3 is a block diagram of a 'Faraday Exchanger' component of the electric power converter of FIG. 2.

As described in the Faraday Exchanger patent application, the Faraday exchanger 206 is an electromagnetic apparatus, including a magnetic core 208 with a plurality of windings (not shown) around corresponding portions of the magnetic core 208. The plurality of windings includes: (i) one or more input windings (also referred to herein as a "coil") to receive the dynamically changing AC signal as an AC input signal having dynamically changing electrical characteristics; (ii) one or more output windings to provide an AC output signal; and (iii) one or more control windings configured to control electromagnetic coupling between the input winding and the output winding. As shown in FIG. 3, the Faraday exchanger 206 includes a control component 209 (not shown in FIG. 2) and a power electronics component 210 configured to dynamically control the electrical currents flowing through the control windings of the magnetic core 208 in dependence on the dynamically changing electrical characteristics of the AC input signal so that corresponding electrical characteristics of the AC output signal are relatively constant and include a fundamental frequency equal to the mains supply frequency.

Briefly put, the Faraday Exchanger 206 receives imperfect AC signals, and dynamically controls the magnetic coupling between the input and output windings so that the AC output signal on the output windings is of better quality than the input signal received at the input windings. Depending upon the (variable) quality of the AC input signal and the quality requirements for the AC output signal, this can include dynamically modifying the coupling to provide a target amplitude and fundamental frequency of the AC output signal, dynamically modifying the coupling to reduce harmonics in the AC output signal, and dynamically improving the power factor (i.e., reducing any phase difference between the voltage and current of the output AC signal so that the power factor becomes closer to unity).

With this in mind, the inverter component 204 receives the variable DC output of the PV source 104 and generates a corresponding AC signal. However, unlike the prior art electric power converters described above and shown in FIG. 1, the AC signal is directly generated at the desired mains frequency, which for the purposes of this example will be assumed to be 50 Hz. This mains frequency AC signal is directly applied to the input windings of the Faraday Exchanger 206, which operates generally as described above to generate a corresponding AC output signal, which is provided to the mains supply 106.

Figure 5:
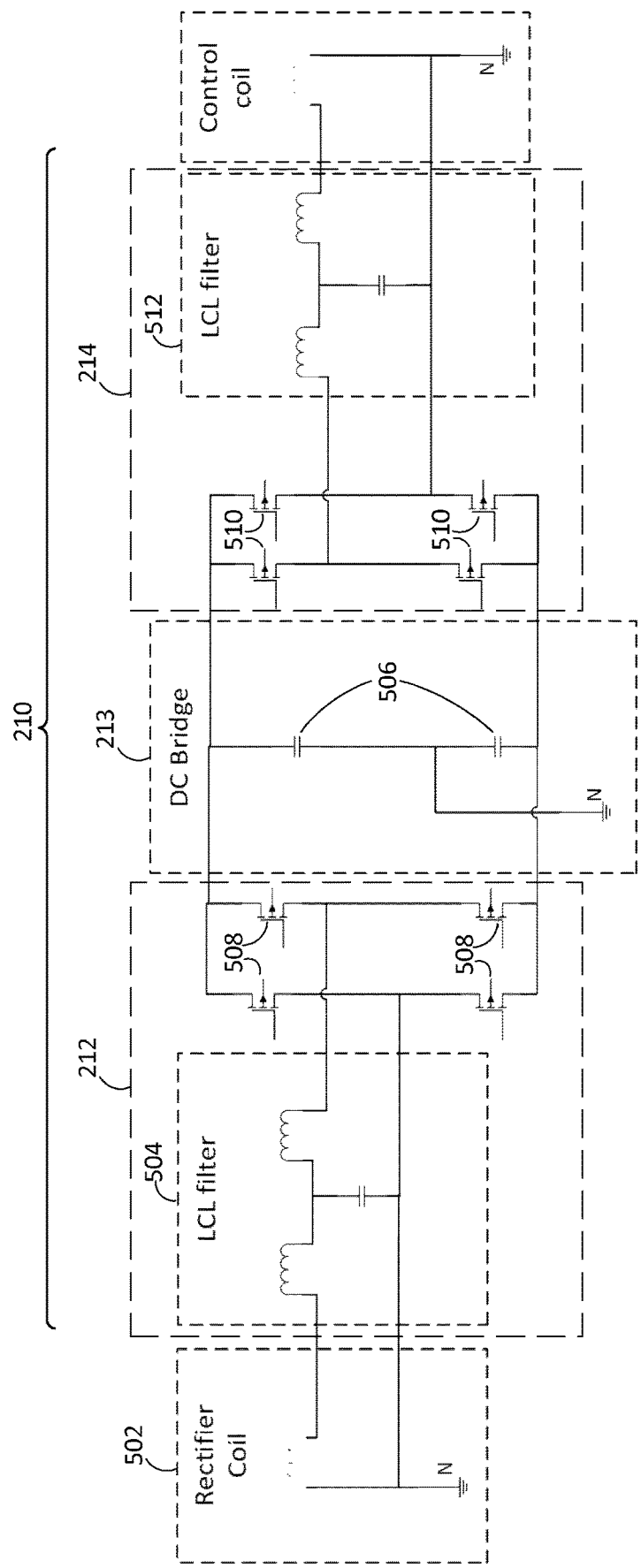
FIG. 5 is a circuit diagram of a power electronics component of the electric power converter for single phase power generation.

As shown in FIG. 2, in the described embodiments the power electronics component 210 of the Faraday Exchanger 206 includes a rectifier 212 coupled via a DC bridge 213 to a second inverter component 214 that generates an AC control signal to power the control windings of the magnetic core 208. (To avoid confusion between the two inverters 204, 214, the inverter component 204 is hereinafter referred to as either the 'first' inverter component 204 or the 'front-end' inverter component 204.) FIG. 5 is a circuit diagram showing more detail of these components 212, 213, 214. A rectifier coil 502 in the form of one or more windings around the magnetic core 208 provides an AC signal that is smoothed by a first analogue filter 504 and is then used to charge capacitors 506 of the DC bridge 213 under the control of a first set of switching transistors 508. The second inverter component 214 includes a second set of switching transistors 510 that receives the resulting DC bridge voltage and generates a corresponding signal in the form of a pulse-width modulated (PWM) square wave. That signal is filtered by a second analogue filter 512 to remove high frequency components and provide a corresponding control signal that is fed to the control coil/windings of the magnetic core 208 in order to dynamically control the magnetic coupling and thus the amplitude, phase angle and harmonic content of the AC output signal.

Figure 6:
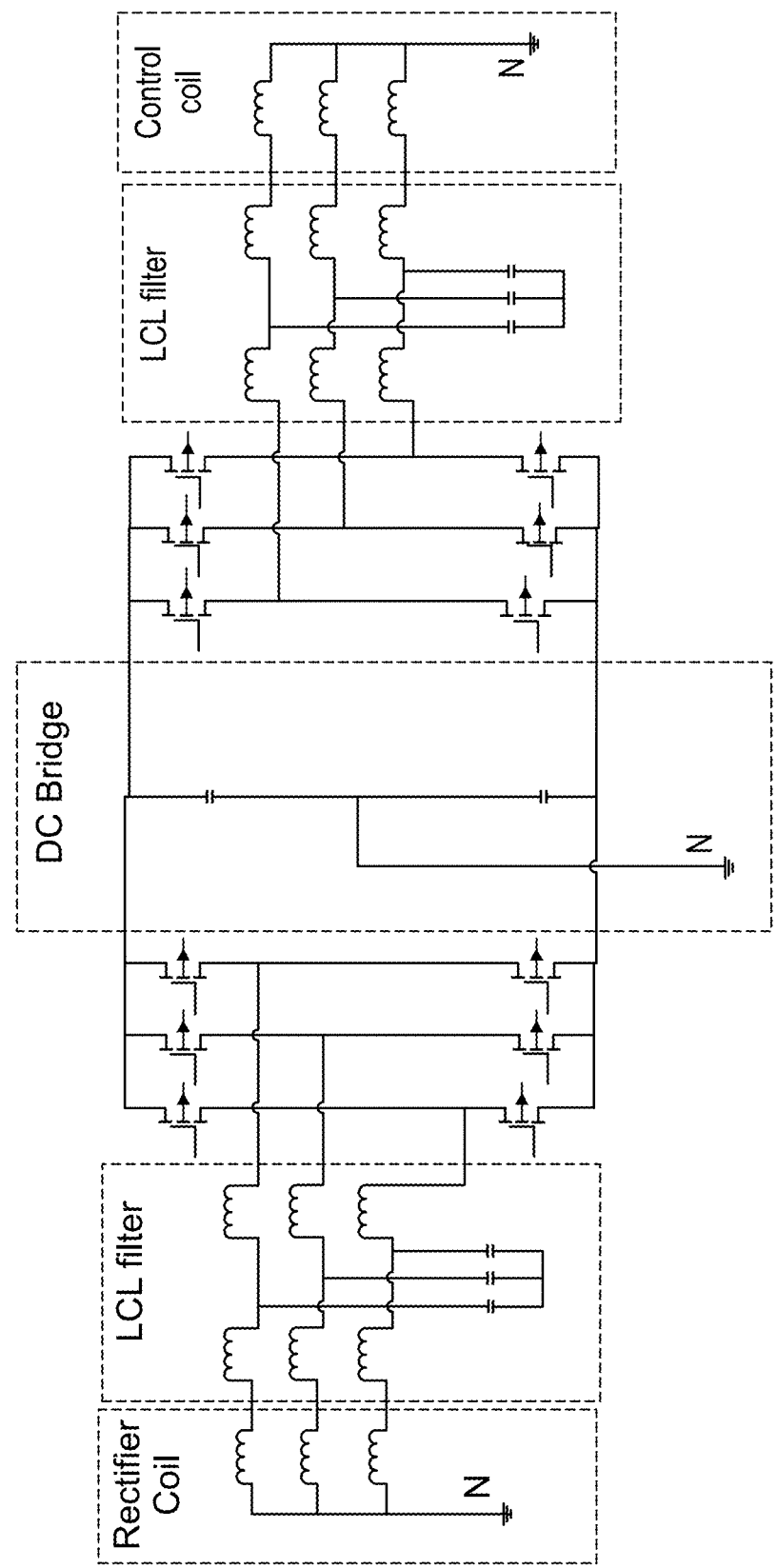
FIG. 6 is a circuit diagram of a power electronics component of the electric power converter for three-phase power generation in accordance with an embodiment of the present invention.
Figure 7:
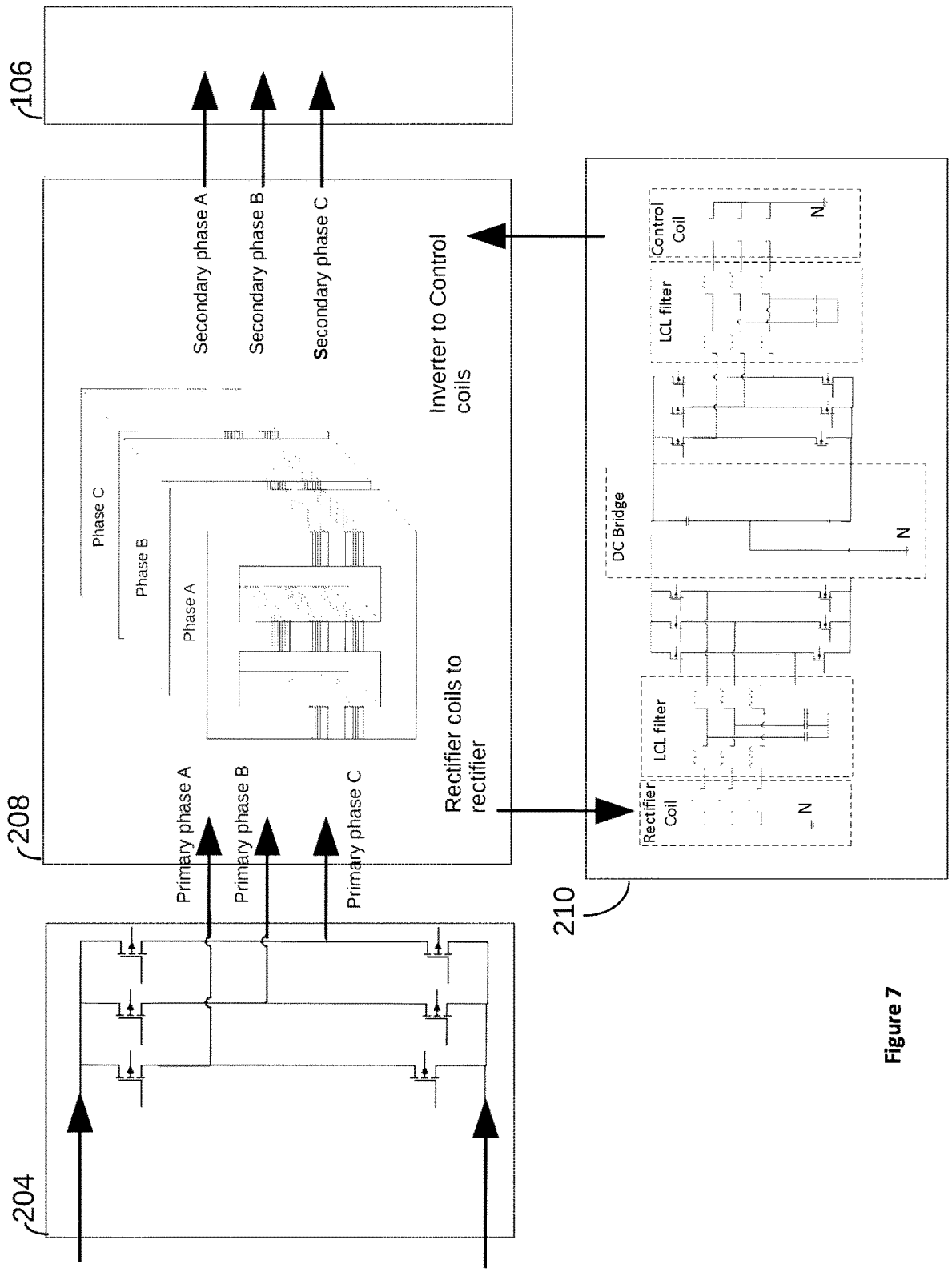
FIG. 7 is a block diagram of an electric power converter for three-phase power generation in accordance with an embodiment of the present invention.

As shown in FIGS. 6 and 7, in a 3-phase power implementation of the electric power converter 202, the inverter component 204 is a three phase component that provides three phase AC power (such as a Semikron SK75 GD066 or an Infineon FS660R08A6P2FLB), and three rectifier coils and respective filters are used to charge the DC bridge, from which three sets of switching transistors and respective second filters generate respective AC signals for the respective phases. Each of the 3 phases A, B and C is controlled by the control system 209, which sends control signals to the power switches via a standard driver circuit that amplifies/filters the control signals (e.g., from 3V to 15V) to drive the power switches.

In a balanced system, phases A, B and C have the same magnitude and frequency, but are respectively phase shifted by 120° (2π/3 radians). In view of the mathematical relation between the three phases, only one phase (e.g., phase A) control is computed and the corresponding controls for phases B and C are the same but with respective phase shifts.

Figure 4:
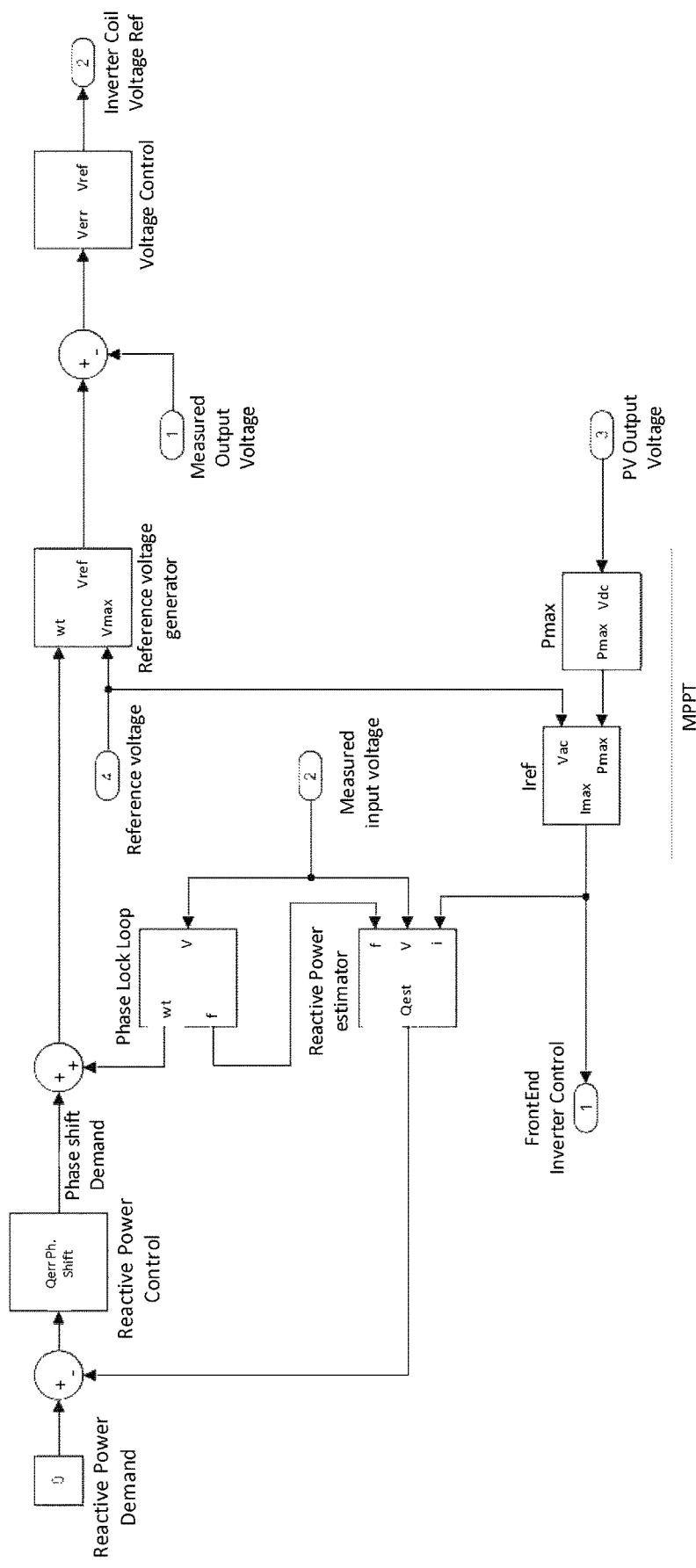
FIG. 4 is a block diagram showing the control loops of a control component of the electric power converter of FIG. 2 in accordance with one embodiment of the present invention.

The rectifier 212 and inverter 214 are respectively controlled by reactive power and voltage control loops of the control component 209. For example, FIG. 4 shows these control loops in accordance with one embodiment. The reactive power control loop operates at a higher frequency than the voltage control loop, and is coupled to the voltage control loop. The reactive power control loop controls the first set of switching transistors 508 and thus the current charging the DC bus capacitor, providing a stable DC link voltage. The voltage control loop provides a regulated output voltage and removes harmonics.

Following the example described above for the prior art PV interface of FIG. 1, the front-end inverter component 204 of the described electric power converter 202 can be similar to the second (output) prior art inverter component 114 of the prior art electric power converter in that it may also be rated at 10 kVA and operate at a switching frequency of 600 Hz to provide an AC output signal of 50 Hz. However, because any defects in the electrical characteristics of its output signal (e.g., in its fundamental frequency and harmonics, and amplitude) can be reduced or mitigated by the following Faraday Exchanger 206, the front-end inverter component 204 can be constituted by a relatively simple (and more reliable) circuit compared to the second prior art inverter component 114, whose output is directly provided to the mains supply or grid 106.

Significantly, the described electric power converter 202 does not include any high frequency inverter component to generate AC having a frequency substantially higher than the mains supply frequency. Whilst this requires the magnetic core 208 of the Faraday Exchanger 206 to be relatively large, the absence of any high frequency inverter component improves the reliability of the electric power converter 202 relative to prior art electric power converter devices such as the apparatus shown in FIG. 1.

Although the Faraday Exchanger 206 does include a rectifier 212 coupled to a second inverter component 214, these components 212, 214 are not in the main signal path and are only used to power the control windings of the magnetic core 208 and do not need to process AC signals constituting the photovoltaic energy, and consequently they can be rated for a significantly lower power handling (and a lower switching frequency) than the rectifier and inverter components of prior art inverter devices such as the one shown in FIG. 1. For example, in a typical application the rectifier 212 and second inverter component 214 of the described interface 202 are rated at only 2 kVA, five times lower than the corresponding prior art inverter 108, 114 and rectifier 112 components of FIG. 1. Additionally, all of the switching components (i.e., the rectifier 212 and the first and second inverter components 204, 214) of the described electric power converter 202 all operate at the relatively low switching frequency of only 600 Hz (being 12×the mains supply frequency of, in this example, 50 Hz).

Thus the described electric power converter 202 is more reliable than prior art electric power converter devices, at least because, in the interface 202:
(i) all of the active switching components 204, 212, 214 operate at a relatively low switching frequency (e.g., 600 Hz), and for this reason alone (due to lower switching losses and reduced stress) are more reliable (and are cheaper) than corresponding prior art components operating at higher switching frequencies, as described in *Electrical Parameters Characterization of Aged IGBTs by Thermo-Electrical Overstress*, E. Dimech, IEEE Conference on Industrial Electronics, 2018; and
(ii) in any case, only one of the active switching components (the front-end inverter component 204) is in the main signal path and thus needs to be rated for high power handling (e.g., 10 kVA).

For at least these reasons, the active switching components 204, 212, 214 can be more reliable than corresponding components of the prior art, and thus the described electric power converter 202 is substantially more reliable than the prior art electric power converter 102 of FIG. 1.

Additionally, the signal improving functions of the Faraday Exchanger 206 allow the front-end inverter component 204 to be relatively simple, with fewer parts than the inverter components of the prior art, because the resulting noise in the AC signal generated by the front-end inverter component 204 can be reduced or mitigated by the Faraday Exchanger 206.

Figure 13:
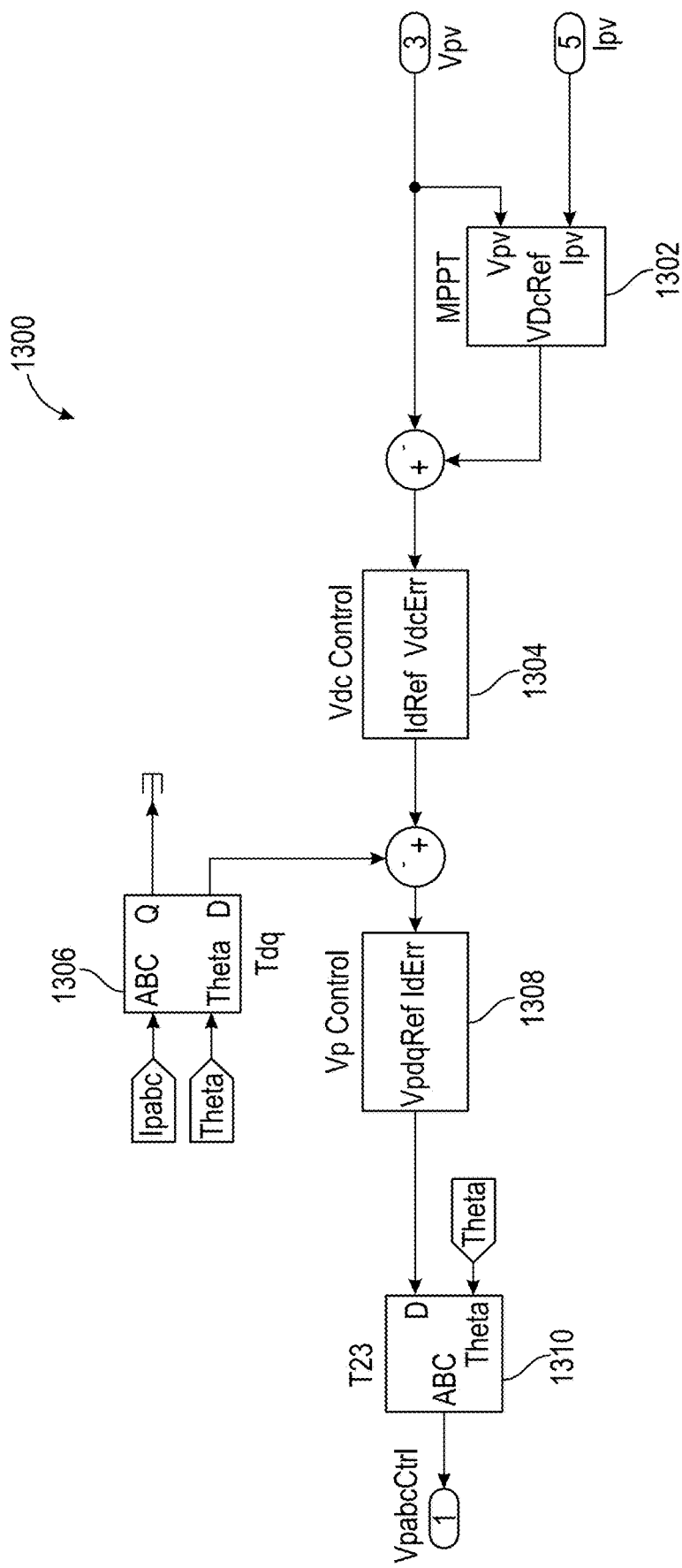

As described above, and in more detail in the Faraday Exchanger patent application, the Faraday Exchanger 206 includes multiple control loops, including a phase lock loop (PLL), a voltage control loop and a reactive power (or current) control loop. As shown in FIGS. 4 and 13, the control component 209 of the Faraday Exchanger 206 of the described embodiments includes an additional ('MPPT') control loop to implement a maximum power point tracking ("MPPT") process known to those skilled in the art to optimise the power extracted from the PV source 102.

Figure 8:
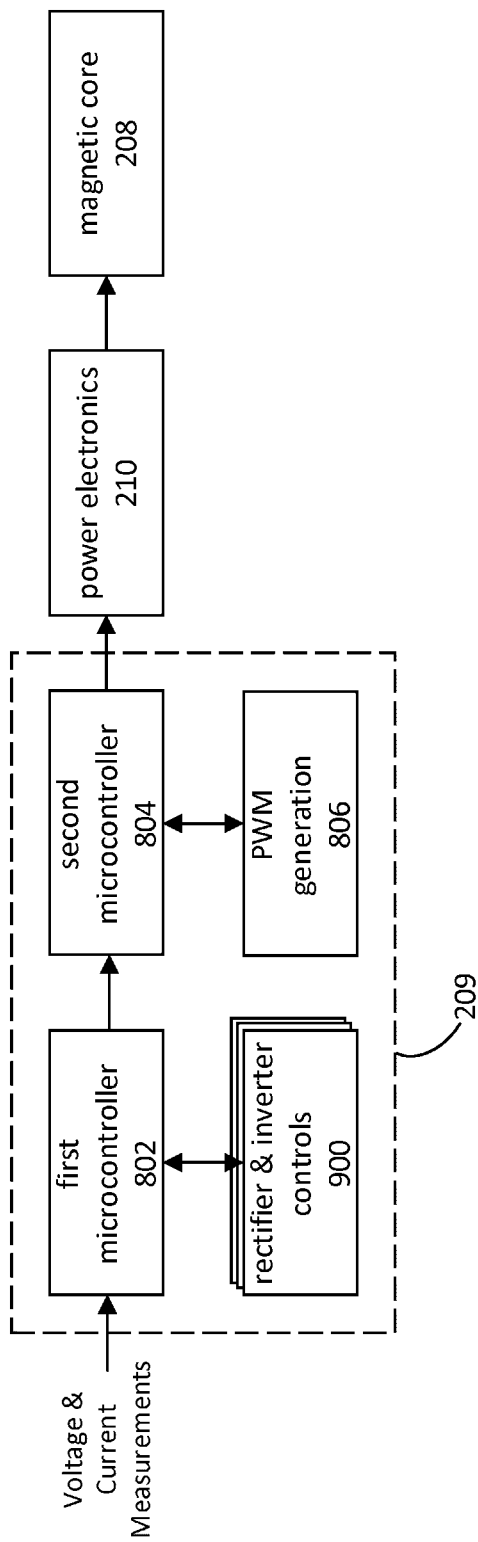
FIG. 8 is a block diagram illustrating components of the control system 209 and the flow of signals from voltage and current measurements to the control windings of the magnetic core.
Figure 9:
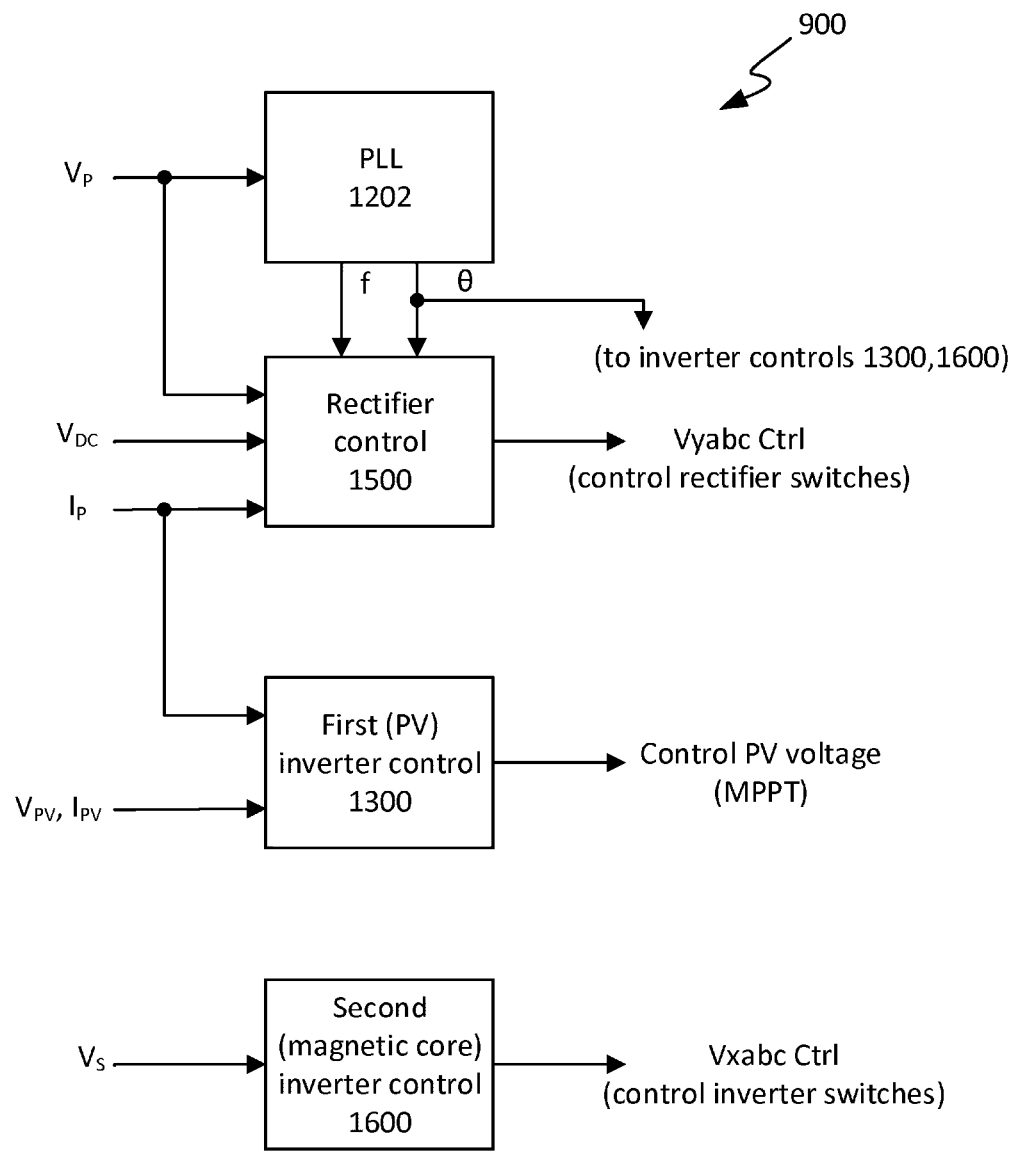
FIG. 9 is a block diagram showing rectifier and inverter control components of the control system and their input and output signals.

The operation of the electric power converters described herein is controlled by the control system 209. FIG. 8 includes a block diagram of the control system 209 in accordance with the described embodiments of the present invention. In these embodiments, the control system 209 includes two microcontrollers: a first microcontroller 802 configured (by way of rectifier & inverter control modules 900, as shown in FIG. 9) to execute the electric power converter processes of FIGS. 11 to 16 and thus generate corresponding control signals for the rectifier 212 and the inverters 204, 214, and a second microcontroller 804 configured (by way of a PWM generation module 806) to generate corresponding pulse-width modulation (PWM) signals to drive the front-end inverter component 204 and the switching transistors 508, 510 of the rectifier 212 and the second inverter component 214 of the power electronics component 210. The rectifier and inverter control processes 900 and the PWM generation modules 806 are stored as firmware of the first and second microcontrollers 802, 804, respectively. In the described embodiments, the first microcontroller 802 is a Xilinx Zynq UltraScale+ MPSoC (which integrates an ARM™ processor with FPGA programmable logic) installed on an UltraZed-EG SOM (system-on-module), as described at www.zedboard.org/product/ultrazed-EG, and the second microcontroller 804 is a Texas Instruments TMS320F2837xD dual-core microcontroller. However, it will be apparent to those skilled in the art that different microcontrollers and/or FPGAs (or combinations thereof) may be used in other embodiments. Thus in general the electric power converter processes described herein may be implemented as processor-executable instructions and/or as configuration data for programmable logic, typically stored in at least one computer-readable storage medium (including as firmware in non-volatile storage).

As shown in FIG. 9, the first microcontroller 802 of the control system 209 receives signals representing the solar panel voltage (Vpv) and current (Ipv), the primary winding voltage (Vp) and current (Ip), the secondary winding voltage (Vs) and the DC voltage (Vdc) on the capacitors 506 of the DC bridge 213, and executes an electric power converter process, as shown in FIGS. 11 to 16, that controls the operation of the rectifier 212 and the inverter components 204, 214 in order to control characteristics of the corresponding output electric power such as voltage, harmonic content, and power factor. (The first microcontroller 802 also receives signals representing various reference voltages, but these are not shown in FIG. 9 for the sake of simplicity.)

The first microcontroller 802 includes analogue-to-digital converters (ADCs) $ADC_0$ to $ADC_N$ that receive and digitise analog input signals representing the voltages and currents described above. The first microcontroller 802 then processes the resulting digital signals to generate corresponding digital control signals, including, for each of the three phases:

(i) a corresponding first (PV) inverter control signal to control the corresponding output voltage of the front-end (PV) inverter component 204 to maximise output power;

(ii) corresponding rectifier control signals to control the power factor of each phase; and (iii) corresponding second inverter control signals to control the magnetic coupling between the corresponding primary and secondary windings of the corresponding magnetic core 208, and thus the amplitude, fundamental frequency and harmonic content of the corresponding phase of the AC output signals of the electric power converter.

In the described embodiments, the electric power converter process is developed as a Simulink™ model using MATLAB™ Simulink™, and for simplicity of description, the model has been divided into sub-components (i.e., sub-processes) as shown in FIGS. 11 to 13 and 15 to 16, which are screenshots of MATLAB™ Simulink™, and where reference elements (referred to as "GOTO" and "FROM" blocks) are shown to indicate linkages between the various components. As known by those skilled in the art of control systems, the functional blocks in these screenshots are referred to as 'controllers', and are implemented using standard control theory, as described in standard textbooks such as N. S. Nise, *Control Systems Engineering, Sixth Edition*, John Wiley & Sons, 2011 ("Nise"), for example.

Figure 10:
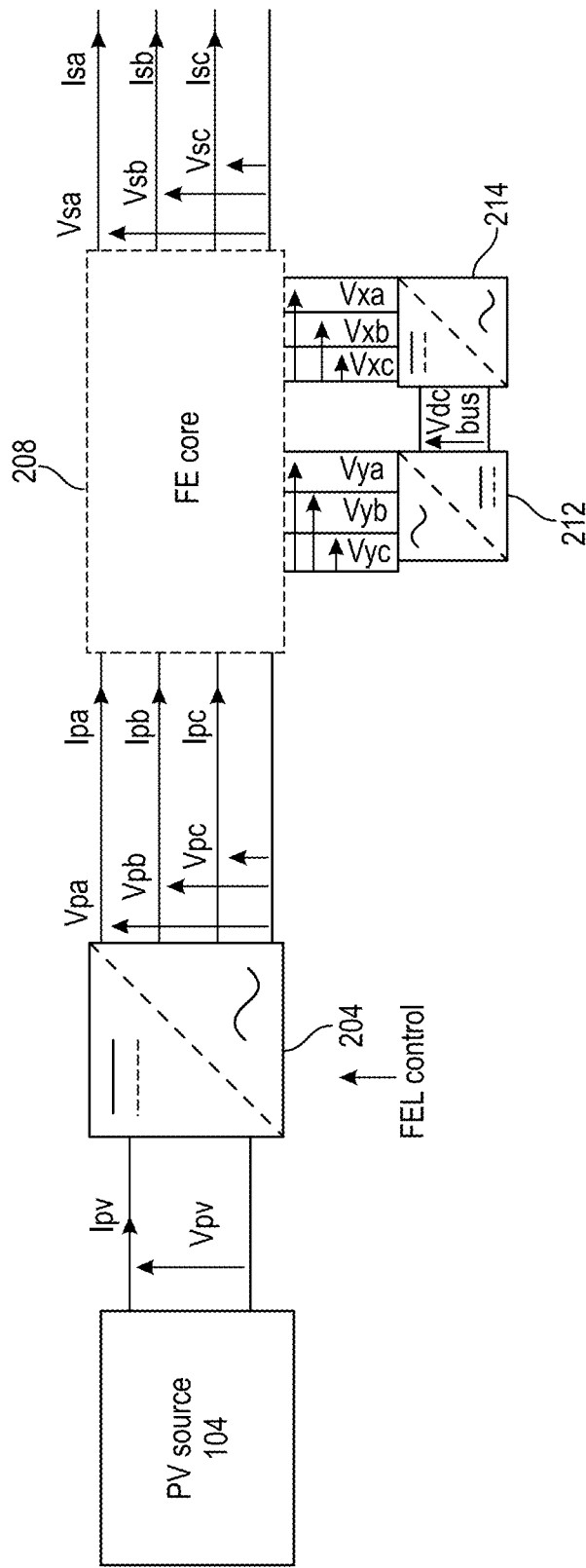
FIG. 10 is a schematic diagram illustrating various voltages and currents of the electric power converter.

FIG. 10 is a schematic diagram of the electric power converter illustrating the nomenclature used in the Figures to represent the various voltages and electric currents, these being summarised in Table I below.

TABLE 1

Symbols and their Meanings

| Symbol | Meaning |
|---|---|
| Vp | Primary voltage |
| Vpabc | Primary voltages in abc frame |
| Vpdq | Primary voltages in dq frame |
| Ip | Primary current |
| Ipabc | Primary currents in abc frame |
| Ipdq | Primary currents in dq frame |
| Vs | Secondary voltage |
| Vsabc | Secondary voltages in abc frame |
| Vsdq | Secondary voltage in dq frame |
| Is | Secondary current |
| Isabc | Secondary currents in abc frame |
| Isdq | Secondary currents in dq frame |
| Vx | Inverter (214) coil voltage |
| Vxabc | Inverter (214) coil voltage in abc frame |
| Vxdq | Inverter (214) coil voltage in dq frame |
| Vy | Rectifier (212) coil voltage |
| Vyabc | Rectifier (212) coil voltage in abc frame |
| Vydq | Rectifier (212) coil voltage in dq frame |
| VyRef | Rectifier (212) reference voltage |
| Vpv | Output voltage of PV panel(s) |
| Ipv | Output current of PV panel(s) |
| VdcBus | DC bus voltage between rectifier 212 and inverter 214 |
| VdcBusRef | DC bus voltage reference |
| Theta | phase angle of the primary signals |
| f | primary signal frequency |
| Q | reactive power on primary side |

Figure 11:
FIGS. 11 to 13 are MATLAB™ Simulink™ screenshots illustrating the phase-locked loop (PLL) and first (PV) inverter component control loops of an electric power converter process executed by the control system.
Figure 11:
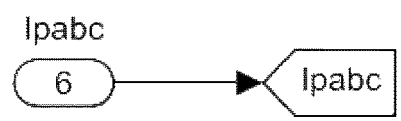
Figure 12:
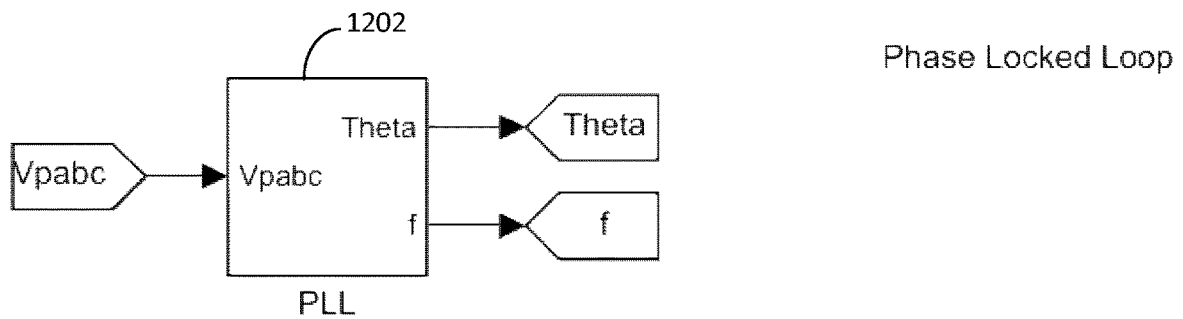

As shown in FIG. 11, the measured voltages and currents of the primary windings of the magnetic cores 208 in the three-phase "abc" frame are represented as corresponding digital values Vpabc and Ipabc. As shown in FIG. 12, the Vpabc values are provided as inputs to a phase-locked-loop (PLL) controller 1202 to generate corresponding measured values of the frequency (f) and phase (Theta) of each primary voltage phase.

As known by those skilled in the art, and as described in the Faraday Exchanger patent application, the phase-locked loop (PLL) does this by monitoring the input voltage and synchronizing the frequency and phase angle of a reference voltage generator to the input waveform.

First (PV) Inverter Component Control

The operation of the first (PV) inverter component 204 is controlled by a first (PV) inverter control loop, as shown in FIG. 13. Starting at the right-hand side of this Figure, the measured photovoltaic panel output voltage Vpv and current Ipv are provided as inputs to an MPPT controller process 1302 to generate a corresponding reference voltage VdcRef, being the optimal voltage at which the PV 104 will deliver maximum power at the measured PV current Ipv.

In the described embodiments, the MPPT process is the one described in Hebchi, M. & Abdellah, Kouzou & Abdelghani, Choucha (2018), *Improved perturb and observe algorithm for maximum power point tracking in a photovoltaic system*, EEA—Electrotehnica, Electronica, Automatica 66, 5-14. However, this need not be the case in other embodiments.

Figure 14:
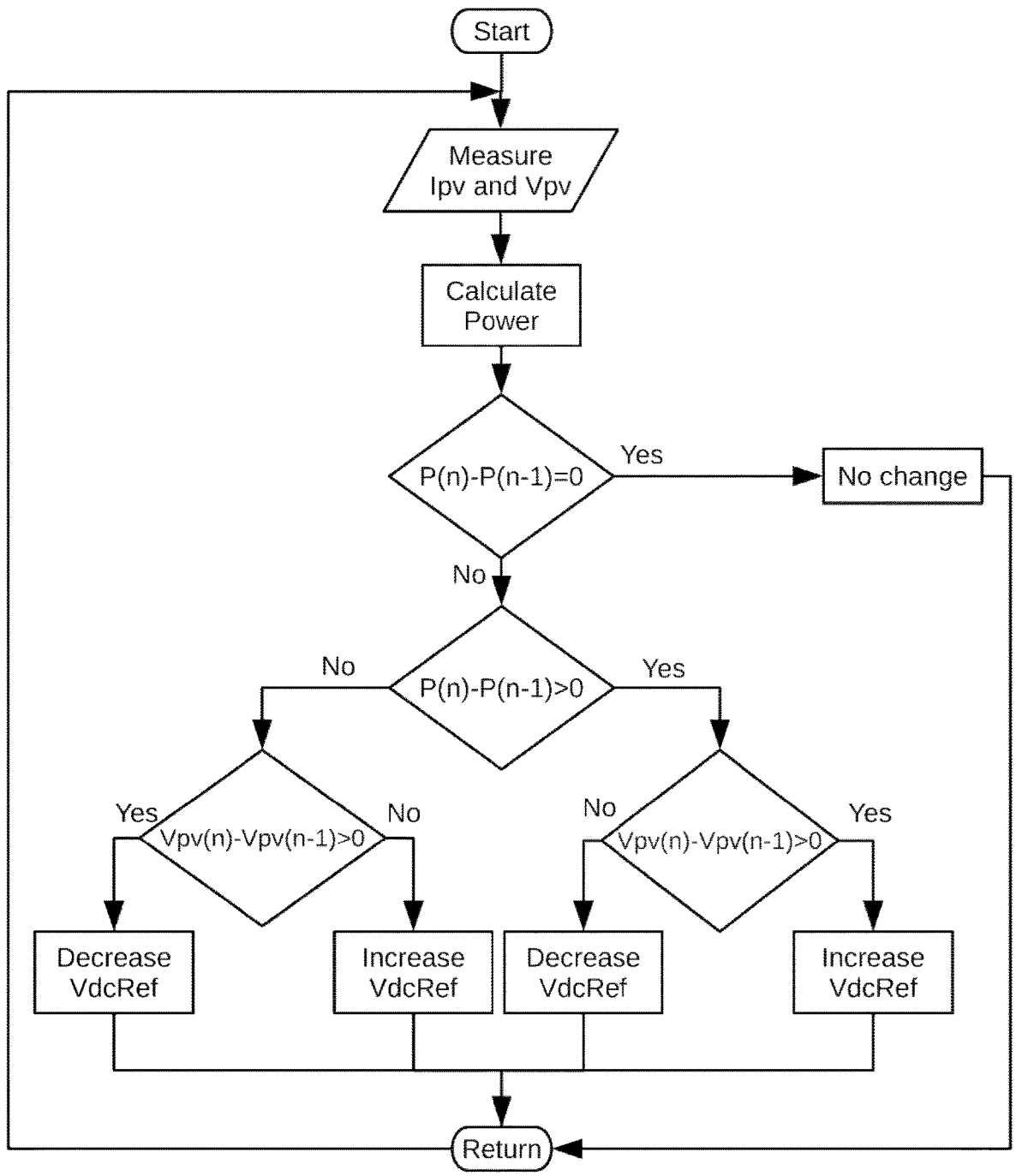
FIG. 14 is a flow diagram of an MPPT process of the first (PV) inverter component control loop of FIG. 13.

As a PV panel is a current source, the control is operated on the voltage, as shown in FIG. 14. At a defined sampling period, the instantaneous PV panel power is computed from the voltage and current at the input terminal of the first (PV) inverter component 204, respectively Vpv and Ipv. At each step n, the new calculated power P(n), is compared with its previous value P(n−1). Depending whether the power has increased or decreased, the voltage reference VdcRef is varied in the same or the opposite direction. For example, for a given current Ipv, if increasing V produces more power, then the voltage reference is increased until the power starts decreasing, and vice versa.

Returning to FIG. 13, the MPPT process output, the reference voltage VdcRef, is compared to the measured primary voltage Vpv, and the difference VdcErr is provided to a Vdc controller 1304 which generates a corresponding current reference IdRef to be drawn on the AC side. The current reference IdRef is defined in the dq frame. As known by those skilled in the art, the dq frame simplifies three-phase power processes by projecting three phase voltages and currents onto a two-axis reference frame.

The current reference IdRef is then compared with the actual primary winding currents (these being the electric output of the inverter component 204). This is achieved by first using a Tdq block 1306 to convert the primary current values from the abc frame to the dq frame, using Ipabc and Theta as inputs.

The resulting error IdErr is processed by a "Vp control" block 1308 to generate a corresponding primary voltage reference VpdqRef in the dq frame, and a "T23" block 1310 transforms it to the abc frame (as VpabcCtrl) in order to drive the front-end (PV) inverter component 204. In the described embodiments, the first (PV) inverter component 204 is a Semikron Solar PV inverter such as a SEMIS-TACK™RE for MVA applications, or a SEMITOP™3 SK75 GD066T IGBT module for kVA applications. However, it will be apparent to those skilled in the art that other makes and/or models of inverters may be used in other embodiments.

Rectifier Component Control

As shown in FIG. 5, the rectifier component 212 receives AC power from one or more rectifier windings around the magnetic core 208, and rectifies that power in order to charge the DC bridge capacitors 506 (that power the second (Faraday Exchanger) inverter 214 that generates the AC current for the control windings of the magnetic core 208. The charging of the DC bridge capacitors 506 is controlled by a rectifier control loop, as shown in FIG. 15.

Figure 15:
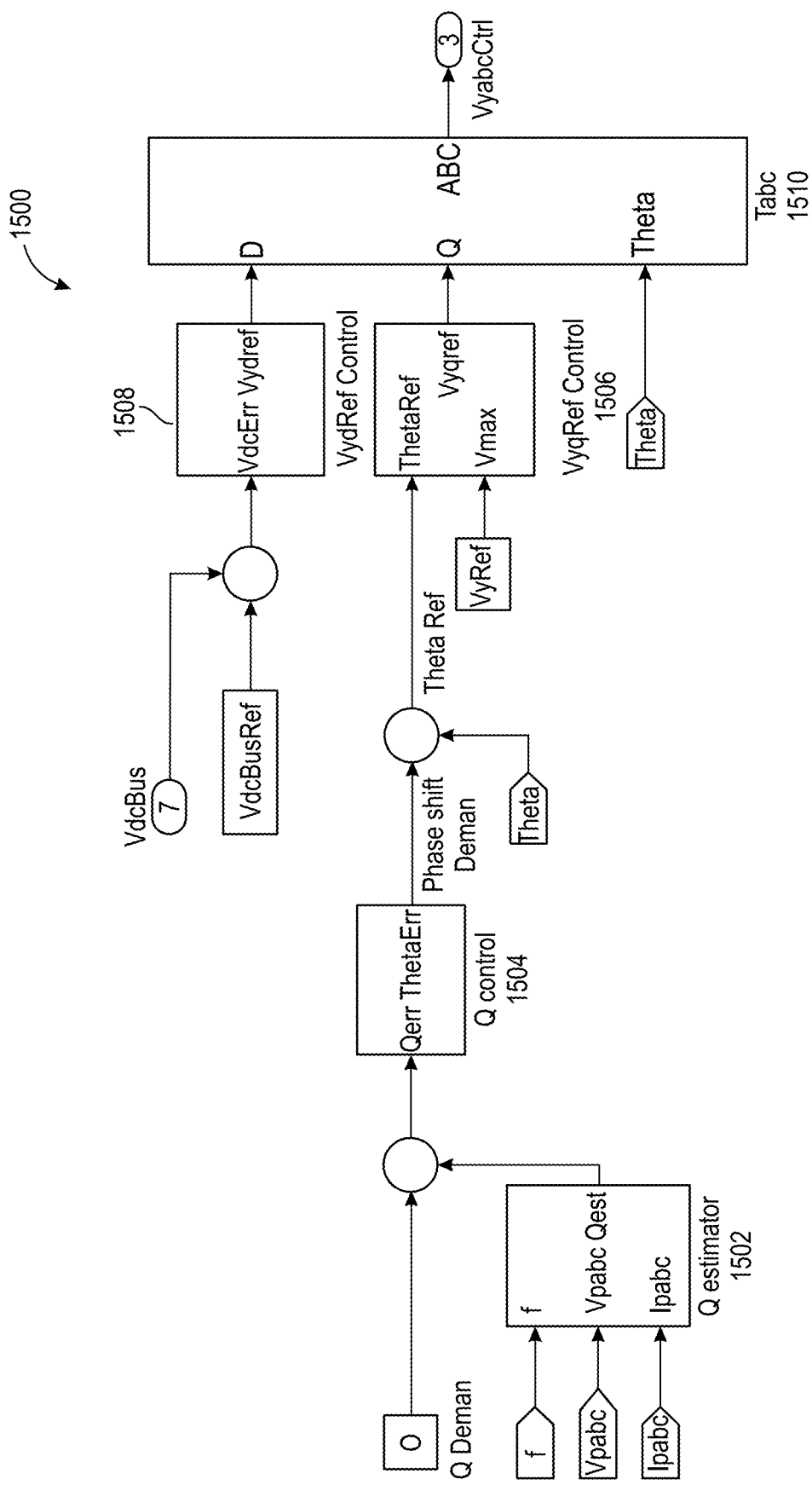
FIGS. 15 and 16 are MATLAB™ Simulink™ screenshots of a rectifier control loop and a second inverter control loop, respectively, of the electric power converter process.

Starting from the left-hand side of FIG. 15, a "Q estimator" block 1502 is used to estimate the reactive power Q being consumed at the output of the electrical power converter from the measured primary voltage Vpabc and primary current Ipabc and the frequency f estimated by the PLL 1202. In order to determine the relative phase shift between the voltage and current, the "Q estimator" block 1502 measures both of these quantities over a full cycle, which is why the frequency is required.

The error between a reactive power reference (0) and the estimated Q is calculated and fed to a reactive power control block ("Q control") 1504 which generates a corresponding phase shift demand value representing the phase angle by which the signals need to be shifted in order for the reactive power to be reduced to zero. The phase shift demand is added to the actual measured phase Theta to provide a reference phase ThetaRef, being the phase angle that would eliminate the reactive power at the primary windings of the magnetic core 208, this being a proxy for the reactive power at the secondary windings of the magnetic core 208.

When considering signals in the DQ frame, reactive power is carried on the Q (quadrature) axis. Consequently, the control of reactive power can be seen as controlling the Q component of the voltage. As ThetaRef represents how much additional reactive power is needed to reduce the net reactive power to zero, a VyqRef Control block 1506 combines it with the rectifier voltage reference (VyRef) to provide Vyabc, according to:

$$Vyabc = VyabcRef \sin(wt + ThetaRef).$$

This voltage is then converted to the dq frame to provide VydqRef, and because it represents reactive power, only its Q component VyqRef is output.

When considering the signals in the DQ frame, the active power is carried on the D axis. For this reason, the active (or average) power present on the DC bridge 213 between the rectifier 212 and the inverter 214 is controlled by Vydref, the D (direct) component of the rectifier input voltage, which is calculated by a VydRef controller 1508 from VdcErr, the error between the measured Vdcbus and its reference voltage VdcBusRef. The D and Q components are combined by a "Tabc" block 1510 to generate a corresponding voltage control signal VyabcCtrl in the abc frame that is used to control the switching transistors 508 of the rectifier component 212. The direct component of this signal is used to charge the capacitors 506 of the DC bridge 213, whereas the quadrature component is used to inject (and absorb) reactive power to (and from) the primary windings from (and to) capacitors 506 in order to reduce the net reactive power of the primary (and thus secondary) windings of the magnetic core 208 to zero. For example, FIG. 17 is a schematic circuit diagram showing how the primary windings of each phase are coupled to the capacitors 506 via a corresponding inductor (to ensure that only reactive power flows to and from the primary windings), where the voltages Ex, Ey, and Ez on the capacitor side of the respective inductors are controlled to be in phase with the respective primary winding voltages Ez, Eb, and Ec. On average, the reactive power flowing to and from the capacitors 506 is zero.

Control Windings Inverter Control

Figure 16:
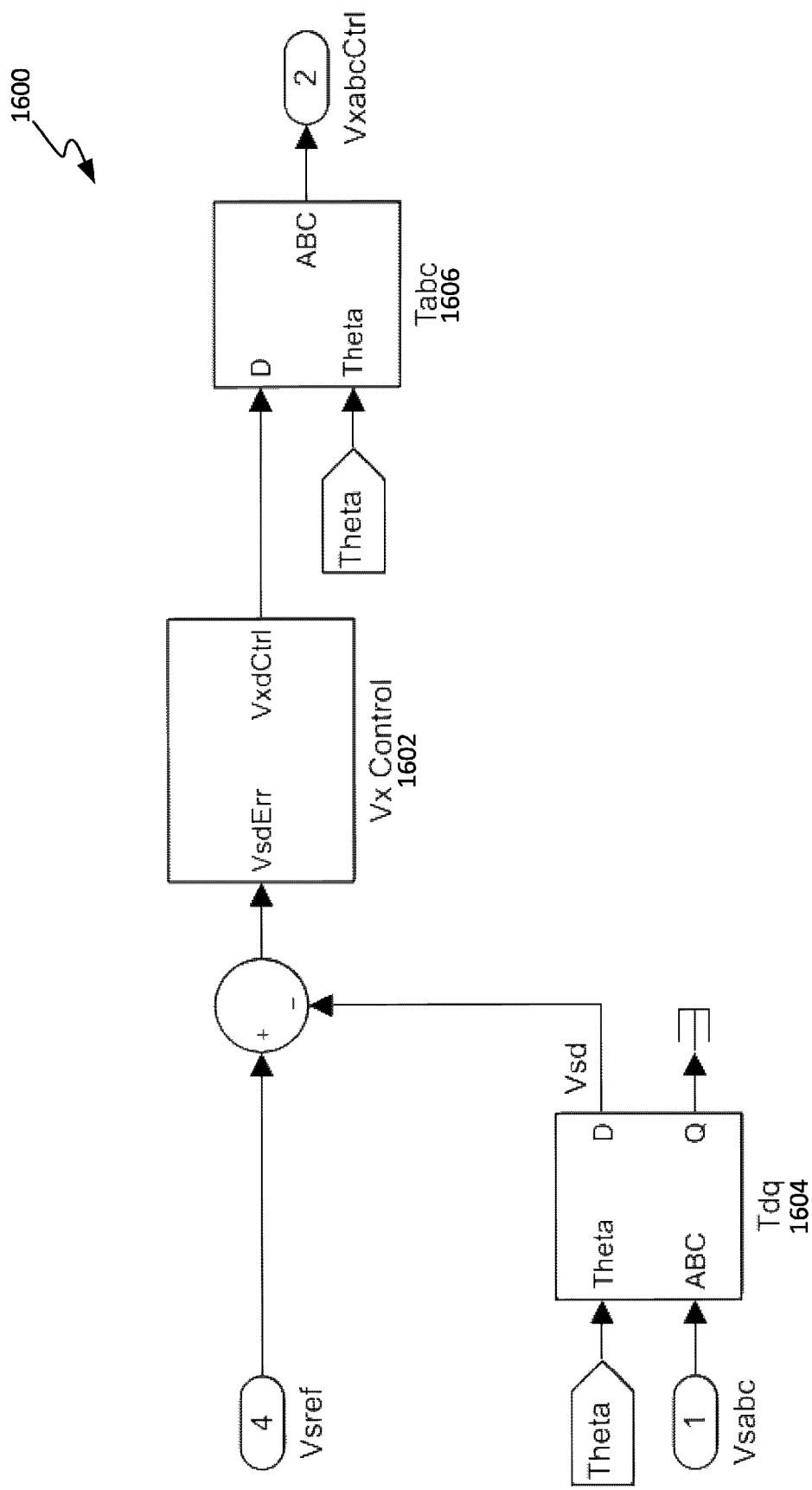

The currents flowing through the control windings of each magnetic core 208 are generated by the second (magnetic core) inverter component 214 of the power electronics 210 under control of a voltage control loop, as shown in FIG. 16.

In the voltage control loop, a voltage controller 1602 monitors the error between this reference and the measured output voltage, and generates the corresponding control demand needed to drive the voltage error to zero. The measured secondary voltages Vsabc are transformed to the DQ frame by a Tdq block 1604, and their direct (D) components are compared to the secondary reference voltages VsRef, the latter being the target or desired voltage and frequency (e.g., an RMS voltage of 220 VAC at a frequency of 60 Hz, with no harmonics and no quadrature (Q) components) to provide a voltage error VsdErr.

The error on the secondary voltages is then used to generate a voltage control VxdCtrl for the magnetic core inverter component 214. That voltage control is generated in the dq frame, so requires a transformation to the abc frame by a Tabc block 1606 to generate a suitable control voltage VxabcCtrl for controlling the magnetic core inverter component 214.

The control voltage VxabcCtrl is converted to an analogue output signal by one of the ADCs of the first microcontroller 802, and is received by the second microcontroller 804, which, by way of the PWM generation module 806, uses it to generate a corresponding PWM control signal that is used to drive the switching transistors 510 of the magnetic core inverter component 214 via a standard driver circuit known to those skilled in the art, such as an Intelligent Power Module (IPM) or an Infineon 6ED003-F2 family full bridge driver, for example.

The controlled switching of the switching transistors 510 determines the current flowing through the control windings of the magnetic core 208, which controls the magnetic coupling between the primary and secondary windings of the corresponding magnetic core 208, and thereby the (RMS) voltage and harmonic content of the electric power output by the electric power converter. In combination with the power factor control effected by the rectifier component 212, the electric power converters described herein are able to generate clean and stable electric power from solar radiation suitable for injecting into an electric power grid or other form of electric power distribution.

The voltage control loop 1600 of FIG. 16 and the rectifier control loop 1500 of FIG. 15 are configured so that the latter 1500 is at least about ten times faster than the former 1600 such that the DC voltage on the capacitors 506 appears to be constant to the voltage control loop 1600, despite being used to supply (or absorb) reactive power to (or from) to control the power factor.

In some other embodiments, voltage control is achieved using frequency heterodyne principles from communications theory. Although the use of heterodyning as described herein inevitably incurs energy losses, it can be useful in some applications, particularly where the size and weight of the transformer core are constrained.

As known by those skilled in the art, frequency heterodyning is a method that produces new frequencies by combining or mixing two input frequencies. Two signals at frequencies f1 and f2 are mixed combined to create two new signals referred to in the art as heterodynes, one at the sum f1+f2 of the two frequencies, and the other at the difference frequency f1−f2.

Accordingly, in such implementations, the power electronics component 210 includes a variable frequency oscillator and a variable frequency filter whose isolation and filter frequencies are determined by the frequency control signals generated by the control component 209, allowing the mixing signal to be varied to ensure that the output signal is always at the desired output frequency.

Many modifications will be apparent to those skilled in the art without departing from the scope of the present invention.

The invention claimed is:

1. An electric power converter for a photovoltaic energy source, including:
   an inverter component configured to receive electrical energy in the form of a dynamically changing DC signal generated by the photovoltaic energy source and to generate a corresponding dynamically changing AC signal having a frequency substantially equal to a mains supply frequency; and
   an electromagnetic apparatus, including:
      a magnetic core;
      a plurality of windings around corresponding portions of the magnetic core, the plurality of windings including:
         one or more input windings to receive the dynamically changing AC signal as an AC input signal having dynamically changing electrical characteristics;
         one or more output windings to provide an AC output signal; and
         control windings configured to control electromagnetic coupling between the input windings and the output windings; and
      a control component configured to dynamically control electrical currents through the control windings in dependence on the dynamically changing electrical characteristics of the AC input signal so that corresponding electrical characteristics of the AC output signal are substantially constant and include a fundamental frequency equal to the mains supply frequency,
      wherein the control component is further configured to execute a maximum power point tracking ("MPPT") process to dynamically control the output voltage of the inverter component and thereby increase power extracted from the photovoltaic energy source,
      wherein the control component is configured to dynamically control the electrical currents through the control windings to maintain a substantially constant amplitude of the AC output signal, and
      wherein the control component is configured to receive signals representing an output voltage of the photovoltaic energy source, an output current of the photovoltaic energy source, and a voltage of the output windings of the magnetic core and to process the received signals to generate corresponding first control signals to control the output voltage of the inverter to maximize output power of the photovoltaic energy source, and second control signals to dynamically control the electrical currents through the control windings.

2. The electric power converter of claim 1, wherein the control component is configured to dynamically control the electrical currents through the control windings to reduce harmonics in the AC output signal.

3. The electric power converter of claim 1, wherein the control component is configured to dynamically inject or absorb reactive power to or from the input windings to maintain a power factor of substantially unity.

4. The electric power converter of claim 1, wherein the control component includes a power electronics component to generate the electrical currents for the control windings, and one or more signal processing components to control the power electronics component, the power electronics component including a rectifier component, one or more capacitors, and a second inverter component, the rectifier component being configured to receive AC power from windings around the magnetic core and to generate corresponding DC power to charge the capacitors, and the second inverter component being configured to generate the electrical currents for the control windings from power stored in the capacitors, under control of the one or more signal processing components.

5. The electric power converter of claim 4, wherein the one or more signal processing components generate PWM signals to control switching transistors of the second inverter component to generate the electrical currents for the control windings.

6. The electric power converter of claim 4, wherein the rectifier component is further configured to dynamically transfer reactive power between the capacitors and the input windings to maintain a power factor of substantially unity.

7. The electric power converter of claim 6, wherein the one or more signal processing components generate second PWM signals to control second switching transistors of the second inverter component to control the transfer of reactive power between the capacitors and the input windings.

8. The electric power converter of claim 4, wherein the one or more signal processing components includes a first signal processing component configured to generate control signals for controlling the current through the control windings, and a second signal processing component configured to process the control signals to generate corresponding PWM signals to control switching transistors of the power electronics component.

9. An electric power converter process for execution by the control component of the electric power converter of claim 1.

10. At least one computer-readable storage medium having stored thereon processor-executable instructions and/or configuration data representing the electric power converter process of claim 9.

* * * * *